United States Patent [19]

Petersen

[11] Patent Number: 5,269,652

[45] Date of Patent: Dec. 14, 1993

[54] AERODYNAMIC BRAKE ON A WIND ROTOR FOR A WINDMILL

[76] Inventor: Helge Petersen, Klostermarksvej 17, Dk-2700 Broenshoej, Denmark

[21] Appl. No.: 720,526

[22] PCT Filed: Nov. 6, 1989

[86] PCT No.: PCT/DK89/00262

§ 371 Date: Oct. 1, 1991

§ 102(e) Date: Oct. 1, 1991

[87] PCT Pub. No.: WO90/07646

PCT Pub. Date: Jul. 12, 1990

[30] Foreign Application Priority Data

Dec. 23, 1988 [DK] Denmark ............... 7227/88

[51] Int. Cl.⁵ .................................................. F03B 7/00
[52] U.S. Cl. .................................... 416/14; 416/23; 416/DIG. 7
[58] Field of Search ............... 416/14, 23, 24, 31, 416/32, 44, 144, DIG. 7

[56] References Cited

U.S. PATENT DOCUMENTS

| | | | |
|---|---|---|---|
| 2,108,839 | 2/1938 | Wilford et al. | 416/24 |
| 2,497,465 | 2/1950 | Mullin | 416/24 |
| 4,355,955 | 10/1982 | Kisovec | 416/23 |
| 4,374,631 | 2/1983 | Barnes | 416/23 |
| 4,715,782 | 12/1987 | Shimmel | 416/23 X R |

FOREIGN PATENT DOCUMENTS

| | | | |
|---|---|---|---|
| 74199 | 3/1952 | Denmark | 416/DIG. 7 |
| 352811 | 7/1931 | United Kingdom | 416/DIG. 7 |
| 8400053 | 1/1984 | World Int. Prop. O. | 416/23 |

Primary Examiner—Edward K. Look
Assistant Examiner—Todd Mattingly
Attorney, Agent, or Firm—Kenyon & Kenyon

[57] ABSTRACT

A wing for a wind rotor of a windmill has a main part and a turnable part that serves as an aerodynamic brake. The main part of the wing has an outer end spaced radially inward from the wing tip and a notched partial-chord edge portion extending radially inward from the outer end for part of its length. The turnable part includes a first section and a second section. The first section is a full-chord outer tip portion of the wing that extends radially outward from the outer end of the main part of the wing. The second section is a partial-chord portion that extends radially inward from the first section in the notched region of the main part of the wing. Hinges located at the outer end and at the radially inner extent of the notched edge portion of the main part connect the second section of the turnable part to the main part for turning about a pivot line between a stowed position and a deployed position. The pivot line is arranged so that portions of both the first section and the second section extend outwardly from opposite faces of the main part of the wing when the turnable part aerodynamic brake is in the deployed position.

5 Claims, 3 Drawing Sheets

AERODYNAMIC BRAKE ON A WIND ROTOR FOR A WINDMILL

BACKGROUND OF THE INVENTION

1. Field of the Invention

The invention relates to a wind rotor for a windmill, which wind rotor has airfoil blades or wings, each of which is provided with an aerodynamic brake which may be activated upon exceeding a predetermined rotational speed of the wind rotor, which brake consists of a turnable part of the wing and which turnable part preferably is the radially outermost part of the wing.

2. Related Art

A windmill extracts energy from the wind force acting on the blades of the wind rotor and transforms the energy of the wind to electrical, mechanical, or other useful form of energy. The type of windmill for which the invention most advantageously can be put to use is a windmill with a horizontal or approximately horizontal wind rotor axis and having an arbitrary number of wings rotating in an approximately vertical plane perpendicular to the direction of the wind.

To qualify for an operating permit, a windmill must be provided with two braking systems, each on its own being able to prevent the rotor of the windmill from exceeding a specified rotary speed. One of the two braking systems is usually a mechanical brake; the other may conveniently be an aerodynamic braking system which is activated in response to an excessive speed and which through the braking effect of the forces of the air reduces the rotor speed to a safe value. The excessive speed may occur, for instance, if the mechanical brake of the windmill fails when actuated to stop the windmill. The aerodynamic brake may also, besides this primary emergency function, act together with the mechanical brake during the normal operation of the windmill. However this demands that the brake be operated by the control system of the windmill.

Various types of aerodynamic controls and brakes on wind rotors for windmills are known, and the following may be mentioned here:

a) Pitch control

The whole wing may be turned around its longitudinal axis and used to control the windmill. Pitch control is a different function than aerodynamic braking, which is the concern of the present invention.

b) Brakinq Parachute

A braking parachute is placed in a collapsed state in a space in the wing tip, i.e., the radially outermost part of the wing. The use of a braking parachute implies two problems; first that it is time consuming to fold up and again deposit the parachute in the space after it has been in use, and second that it is problematic strengthwise to use braking parachutes in connection with long wings because the braking will be very sudden.

c) Air brakes

Air brakes consist of plates which are inset into the wing and which may be turned into or shifted into the air stream. This type of brake is similar to the brakes used in gliders. Experience with such brakes on windmills shows that they are not sufficiently effective unless they are very long in proportion to the length of the wing and therefore disproportionately expensive.

d) Leading edge flap

On the radially outer approximately 15% of the length of the wing, a leading part, which may include 15-20% of the chord of the wing, is hinged longitudinally to the main part of the wing such that it may be pivoted to a position almost perpendicular to the wing surface.

It is a problem to construct the hinge parts of a leading edge flap so that it will accurately return to the correct stowed position in relation to the main part of the wing behind it, as only a small departure from the designed airfoil profile may produce considerable changes in the aerodynamic characteristics of the wing.

e) Swing tip

The radially outer part of the wing, the tip, which typically constitutes the outer 15% of the total length of the wing, may be rotatable on an axle which extends in the longitudinal direction from the main part of the wing approximately at the middle of the wing chord. When the swing tip is activated, it is turned to a position approximately perpendicular to the rotational plane of the wing. The mounting of this axle presents a number of problems, and at the interface between the main part of the wing and the swing tip the axle is subject to high bending moments. This makes a large diameter of the axle necessary, which involves a corresponding increase in the thickness of the wing.

SUMMARY OF THE INVENTION

It is therefore the object of the invention to provide a windmill blade or wing with an aerodynamic brake which is without the above mentioned disadvantages of the known art.

This object is achieved by a windmill blade or wing having a main part; a turnable part comprising a first section that consists of a radially outermost tip portion of the wing having a width equal to the full chord of the wing and a second section that extends radially inward from the first section and consists of a portion of the wing having a width substantially less than the full chord of the wing; and longitudinally spaced hinges connecting the second section to the main part of the wing.

Compared with the known swing tip, the advantage is that the axle, around which the swing tip turns, is avoided. The construction principle according to the invention is that hinges built into the structure of the main part of the wing may better withstand the aerodynamic forces and the centrifugal forces than a cantilevered axle. The wing therefore does not need to be as thick, which confers a higher efficiency to the wing. For the same reason the brake may be made longer than a swing tip and therefore achieve a better braking effect.

The second section of the turnable part will preferably constitute a trailing edge part of the wing, seen in the direction of rotation, as this interferes least with the designed aerodynamic profile of the wing.

An advantageous embodiment of the turnable part is obtained when the dividing line between the second section and the wing extends substantially in the longitudinal direction of the wing, the axis of the hinge construction extends in the plane of the wing, and the radially innermost part of the hinge construction preferably is placed at a greater distance from the leading edge of the wing than the radially outermost part.

The aerodynamic brake according to the invention belongs to the type of brakes in which a part of the wing is pivoted into a position perpendicular to the normal working position and thereby offers aerodynamic resistance to the rotation of the wing around the wind rotor axis of the windmill.

Compared with the known aerodynamic brake constructions, the principle according to the invention will result in a construction which makes the brake more efficient, safer, stronger and less expensive.

BRIEF DESCRIPTION OF THE DRAWINGS

The wind rotor wing according to the invention will be further explained in the following with reference to the drawings, in which.

DETAILED DESCRIPTION OF THE PREFERRED EMBODIMENTS

Figure 1:
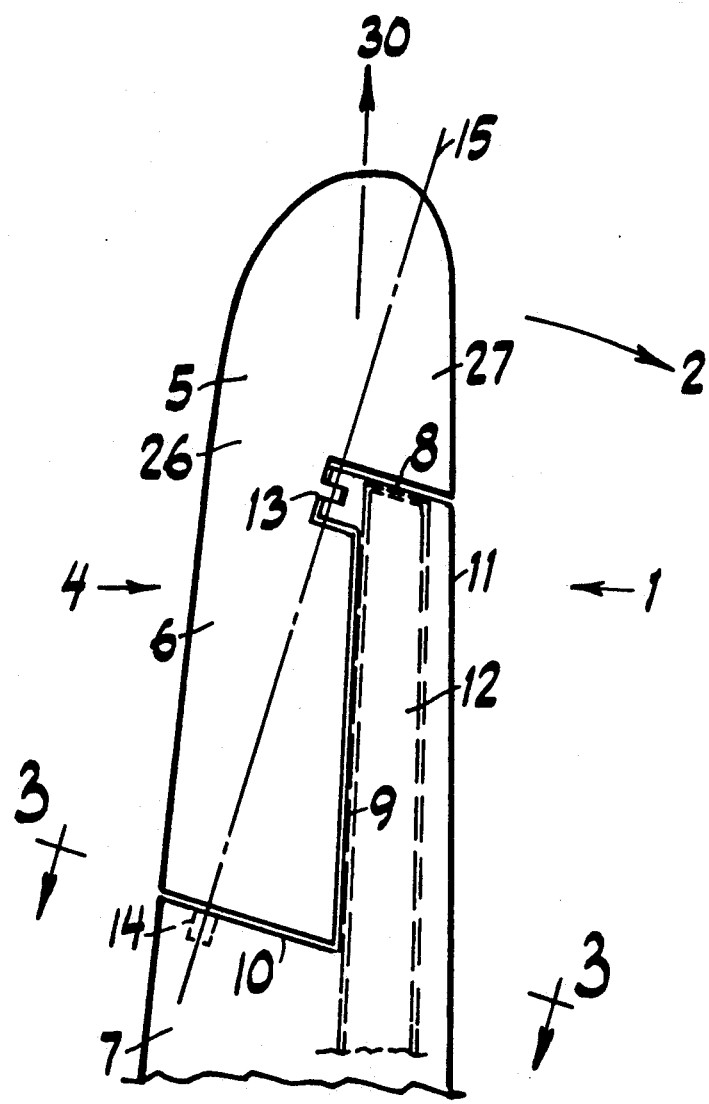
FIG. 1 shows an embodiment of a turnable part on the radially outermost end of a main part of a wing according to the invention in which the wing is assumed to rotate clockwise seen from the front, i.e., in the direction of the wind.

The radially outermost end of a wing 1 for a wind rotor of a windmill in shown in FIG. 1. The wing is viewed from the direction of the wind and is assumed to rotate in the direction shown by the arrow 2, i.e., clockwise. When the wind rotor is turning, the wing will be acted upon by external forces, the forces of the air acting on the wing and the centrifugal force which is indicated by the arrow 30.

The tip of the wing is formed by a turnable part 4 which constitutes an aerodynamic brake for the wing 1. This turnable part 4 comprises a first section 5 and a second section 6. The first section 5 constitutes the radially outermost end of the wing 1 in its full width, as the contour of the section 5 forms a natural part of the contour of the wing. The second section 6 extends radially inward from the first section 5 and is integrally connected thereto. The second section constitutes only a fraction of the width of the wing.

The second section 6 is shown in the drawings as constituting a trailing portion of a main part 7 of the wing 1 with reference to the direction of rotation 2, but it is within the scope of the invention that the second section may constitute a leading portion of the main part 7 of the wing 1.

In plan view, the boundary line between the second section 6 and the main part 7 of the wing 1 forms a Z-shape and may be divided into a transversely extending radially outermost first part 8, a longitudinally extending intermediate second part 9, and a transversely extending radially innermost third part 10. The intermediate second part 9 of the boundary line extends essentially parallel to the leading edge 11 of the wing 1

The wing 1 may have one or more beams 12 which constitute a part of the supporting structure of the wing. The beam or the beams are suggested by dot-and-dash lines in FIG. 1.

The turnable part 4 is pivotally connected to the main part 7 of the wing 1 by hinges 13, 14 which provide a pivot line 15. The pivot line 15 may be placed close to the surface of the wing 1 or inside the wing 1, for instance in the mid-plane of the wing. Hinge 13 is spaced radially outward from hinge 14 and is shown as being attached to the outer end of beam 12 adjacent to the radially outermost part 8 of the boundary line. Hinge 14 is shown as a stub shaft journalled in the structure of the main part 7 of the wing along the radially innermost part 10 of the boundary line. Preferably the radially innermost hinge 14 is at a greater distance from the leading edge 11 of the wing 1 than the radially outermost hinge 13 when the second section constitutes a trailing portion of the wing, so that the pivot line 15 extends obliquely to the rear and radially inward from the leading edge 11. As is clearly apparent from FIG. 1, the oblique pivot line 15 subdivides the surface area of the turnable part 4 into portion 26 on the left of the pivot line and portions 27 and 28 on the right of the pivot line.

The radially outermost first part 8 and the radially innermost third part 10 of the boundary line extend in planes perpendicular to the pivot line 15.

Figure 2A:
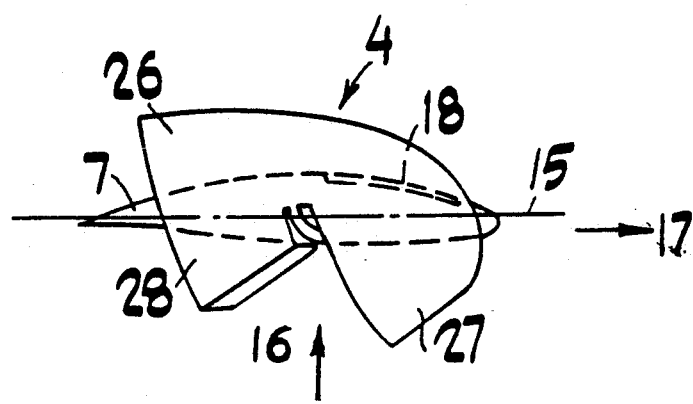
FIGS. 2a and 2b show two alternative directions of pivoting of the part shown in FIG. 1, and FIGS. 3a and 3b are sections along the line 3—3 in FIG. 1, in which the turnable part is placed respectively in a withdrawn or stowed position and in an extended or deployed position.
Figure 2B:
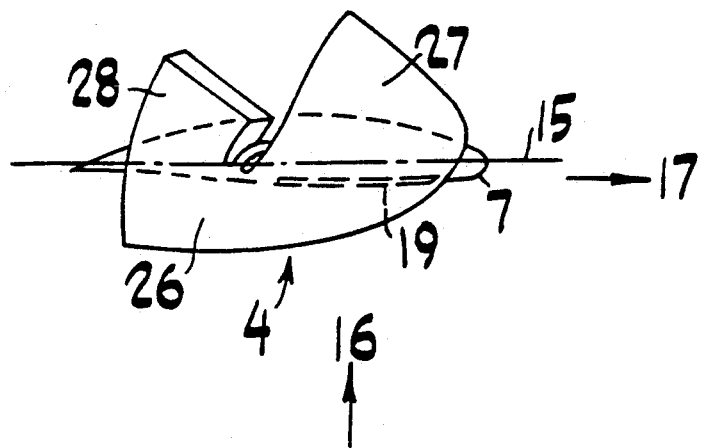

Two optional possibilities of the direction of the pivoting of the brake are shown in FIGS. 2a and 2b. In the embodiment of FIG. 2a the leading edge of the brake is turned against the direction of the wind which is shown by the arrow 16, and in the embodiment of FIG. 2b the leading edge of the brake is turned away from the direction of the wind. The direction of rotation of the wing around the wind rotor axis is indicated by the arrow 17. The choice of direction of turning the aerodynamic brake is immaterial to the invention. In either case, however, the portion 26 of the brake will extend outwardly from one face of the main part 7 of the wing and the portions 27 and 28 will extend outwardly from the opposite face of the wing, as shown in FIGS. 2a and 2b.

Figure 3A:
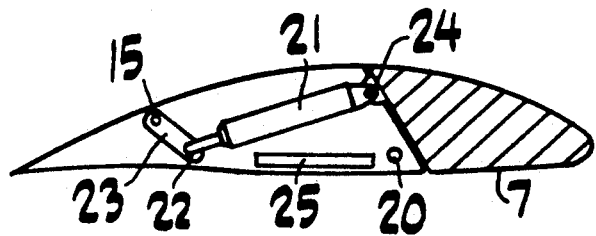
Figure 3B:
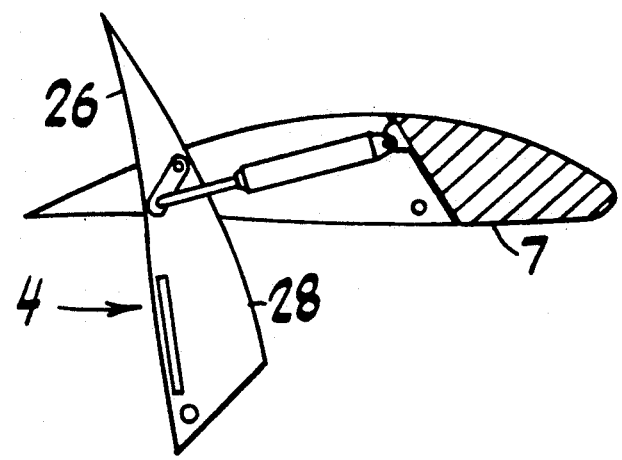

Slits between the wing 1 and the wing tip 4 will necessarily occur at the boundary lines 8, 9, and 10, which slits may adversely affect the desired pattern of air flow along the wing. The brake may bear against abutments, which are indicated schematically by the references 18 and 19 in FIGS. 2a and 2b, in order to limit the air flow through the slits between the main part of the wing and the wing tip 4, as the abutments function as labyrinth seals. FIGS. 3a and 3b show sections through the wing and the brake along the line 3—3 in FIG. 1. These figures concern the embodiment in which the brake is turned in the direction shown in FIG. 2a. FIGS. 3a and 3b show a possible embodiment of the mechanical elements for actuating the brake. As mentioned in the introduction, there are two possible conditions for actuating the brake. One is that the brake solely has an emergency function, i.e., that it is activated only in case the rotor has achieved an excessive speed; the other one is that, in addition to such emergency operation, the brake also may be actuated during normal operating procedure.

In the first mentioned case, the brake is to be activated at excessive speeds and as this implies an increased centrifugal force, it is sufficient to provide the brake with a trip which is activated by the increased centrifugal force. This may be achieved by known means, and a possible place for the trip is indicated at 20. It is usually desirable for the brake to remain deployed, since the malfunction which caused the excess speed may have to be corrected manually. The brake therefore also has to be manually returned to the stowed (normal operational) position.

To limit the impact forces which result from a sudden actuation of the brake, and also to allow time for the activation of the brakes of other wings of the wind rotor before the rate of rotation falls, it is required that the brake turning take place in a damped way. For this reason a hydraulic, pneumatic, or mechanical pamper may be provided. The damper is indicated by 21 and is connected to the brake at the bearing 22 in the crank arm 23 which is fixed to the brake and rotatable about the pivot line 15. The other end of the damper is connected to the main part 7 of the wing by a bearing 24. When the brake is stowed it takes the position shown in FIG. 3a; when it is activated it takes the position which is shown in FIG. 3b.

The turning movement of the brake is achieved partly by the moment of the aerodynamic forces around the pivot line, partly by the centrifugal force in case sufficient weights are built in, and partly by built-in moment producers. The torque of the aerodynamic forces will depend on the angle of incidence of the air flow in relation to the profiles of the wing in the current operational situation in which the brake is to be actuated. If the wind speed is low, the angle of incidence will by small, as the direction of the relative air speed will be dominated by the tangential speed of wind rotor rotation. If the wind speed is great, the angle of incidence correspondingly will by great. It is thus not possible to predict how great the moment of the aerodynamic forces will be, and it is therefore required to actively influence the turning of the brake by built-in moment producers.

The turning movement may be produced actively in several ways, of which three will be explained:

a) A compression spring may be built into the damper 21.
b) A torsion spring (not shown) may be mounted at an arbitrary point along the pivot line 15.
c) Weights, such as metal blocks which are indicated schematically in FIG. 3a by the reference 25, may be built in, which weights are acted upon by the centrifugal force and because of the oblique angle of the pivot line will contribute to the turning of the brake.

In case it is desired to use the aerodynamic brake also as an ordinary operational brake, possibly in connection with the mechanical brake of the windmill, the system may be arranged accordingly by the use of a hydraulic, pneumatic, electromechanical, or other means that is controlled by the control system of the windmill to act upon the trip for the aerodynamic brake release, and to return the brake to the stowed normal operational position by the same means.

I claim:

1. A wing for a wind rotor of a windmill, the wing comprising:
    a main part having an outer end spaced radially inward from a tip of the wing and a partial chord portion extending radially inward from the outer end;
    a turnable part that serves as an aerodynamic brake for the wing, the turnable part including a first section constituted by a full-chord tip portion of the wing extending radially outward from the outer end of the main part and a second section constituted by a partial-chord portion extending radially inward from the outer end of the main part; and,
    hinge means connecting the second section of the turnable part to the main part of the wing for turning about a pivot axis between a stowed position, in which the partial-chord portion of the main part and the second section of the turnable part form a full-chord airfoil, and a deployed position, in which portions of both the first and second sections of the turnable part extend transversely beyond opposite faces of the main part of the wing.

2. A wing according to claim 1 wherein the partial-chord portion of the main part comprises leading edge portion of the wing.

3. A wing according to claim 1 wherein a boundary line between the main part and the turnable part has a Z-shape in a plan view of the wing, the Z-shape comprising radially innermost and outermost parts that are perpendicular to the pivot axis and an intermediate part that extends in the longitudinal direction of the wing.

4. A wing according to claim 3 wherein the pivot axis lies in a plane substantially parallel to the midplane of the wing and extends obliquely with respect to the intermediate part of the boundary line between the main part and the turnable part, such that portions of both the first section and the second section of the turnable part lie on opposite sides of the pivot axis.

5. A wing for a wind rotor of a windmill, the wing comprising;
    a main part having an outer end and a partial-chord leading edge portion extending radially inward from the outer end:
    a turnable part that serves as an aerodynamic brake for the wing the turnable part including a first section constituted by a full-chord tip portion of the wing extending radially outward from the outer end of the main part and a second section constituted by a partial-chord trailing portion extending radially inward from the first section; and
    hinge means connecting the second section of the turnable part to the main part along a hinge axis extending in the plane of the wing, the hinge means having a radially innermost part that is located at a greater distance from the leading edge of the wing than is a radially outermost part of the hinge means, and wherein part of a boundary line between the second section of the turnable part and the main part extends substantially in the longitudinal direction of the wing.

* * * * *